US012465872B2

(12) United States Patent
Lin

(10) Patent No.: US 12,465,872 B2

(45) Date of Patent: Nov. 11, 2025

(54) MULTI-STAGE SYNCHRONOUS DRIVING MECHANISM AND ELECTRIC TOY

(71) Applicant: Shaoqing Lin, Shantou (CN)

(72) Inventor: Shaoqing Lin, Shantou (CN)

( * ) Notice: Subject to any disclaimer, the term of this patent is extended or adjusted under 35 U.S.C. 154(b) by 0 days.

(21) Appl. No.: 19/221,405

(22) Filed: May 28, 2025

(65) Prior Publication Data

US 2025/0288919 A1 Sep. 18, 2025

(30) Foreign Application Priority Data

Nov. 15, 2024 (CN) ......................... 202422799628.4

(51) Int. Cl.

*A63H 31/00* (2006.01)
*A63H 29/22* (2006.01)
*A63H 33/22* (2006.01)
*H02K 7/116* (2006.01)

(52) U.S. Cl.

CPC ............. *A63H 33/22* (2013.01); *A63H 29/22* (2013.01); *H02K 7/116* (2013.01)

(58) Field of Classification Search

CPC .......... A63H 1/00; A63H 13/00; A63H 31/00; A63H 31/06; A63H 31/08

See application file for complete search history.

(56) References Cited

U.S. PATENT DOCUMENTS 3,449,858 A * 6/1969 Balleis ..................... A63H 1/20 446/241
3,510,949 A * 5/1970 Christy .................. A63H 33/22 401/209
4,629,440 A * 12/1986 McKittrick, Jr. ...... A63H 11/20 180/8.6
4,648,487 A * 3/1987 Kimura .................. A63H 31/08 301/6.5
6,022,263 A * 2/2000 Liu .......................... A63H 3/20 446/379
7,347,119 B2 * 3/2008 Sasano ................... A63H 29/22 74/421 A
8,777,766 B2 * 7/2014 Burger ................... A63G 31/02 472/129
9,474,981 B1 * 10/2016 Forti .................... A63H 13/005
10,813,807 B2 * 10/2020 Bartley .................. A61G 7/015
12,129,976 B2 * 10/2024 Wang .................... F21V 23/003
2012/0220186 A1 8/2012 Choh et al.
2018/0214783 A1 * 8/2018 Horikoshi ................ A63H 1/02
2023/0338867 A1 10/2023 Zhang et al.
2024/0316472 A1 9/2024 Xu et al.

* cited by examiner

*Primary Examiner* — Kurt Fernstrom

(57) ABSTRACT

A multi-stage synchronous driving mechanism and an electric toy are provided. The electric toy includes a multi-stage synchronous driving mechanism. In terms of the multi-stage synchronous driving mechanism, on one hand, by means of engagement between a sun gear and a planetary gear, all execution units are ensured to rotate synchronously based on a preset proportion, thereby greatly improving consistency and accuracy of motion among execution units. Further, torque of a motor can be transferred to the sun gear by using the gear transmission component, and a single sun gear can drive a plurality of planetary gears to rotate at the same time, so that the plurality of execution units rotate relative to a support without using a plurality of transmission structures or a plurality of transmission shafts. In this way, the present disclosure may have excellent structural flexibility and lower manufacturing costs.

14 Claims, 5 Drawing Sheets

20

MULTI-STAGE SYNCHRONOUS DRIVING MECHANISM AND ELECTRIC TOY

TECHNICAL FIELD

The present disclosure relates to the field of toys, and in particular, to a multi-stage synchronous driving mechanism and an electric toy.

BACKGROUND

In a conventional toy design, a single power source directly drives a component to move. For example, a certain rotating shaft is directly connected by using a motor, so that a specific toy component can rotate or swing. However, in this manner, limitation exists when a complex motion mode is implemented. Especially, when a plurality of components are required to move simultaneously in a coordinated manner, an additional power unit or a complex linkage mechanism is often required to meet a requirement of a conventional design. This not only increases costs of a toy, but also limits structural flexibility of the toy, thereby easily interfering with a position of another component.

SUMMARY

A technical problem to be solved by the present disclosure is that product costs are increased and structural flexibility of a product is decreased when coordinated motion of a plurality of components needs to be implemented. The present disclosure provides a multi-stage synchronous driving mechanism and an electric toy.

The present disclosure provides a-stage synchronous driving mechanism, including:

- a housing;
- a motor, disposed on the housing;
- a gear transmission component, driven and connected to the motor; and
- a multi-stage execution component, including a support, a sun gear, a plurality of planetary gears, and a plurality of execution units, where the support is disposed on the housing, the sun gear and each of the planetary gears are rotatably disposed on the support, respectively, each of the execution units is connected to each of the planetary gears in a one-to-one correspondence, the sun gear is driven and connected to the gear transmission component, and each of the planetary gears is engaged with the sun gear, respectively; where
- the motor drives the sun gear to rotate by using the gear transmission component, so that the sun gear drives each of the planet gears to rotate, thereby driving each of the execution units to rotate relative to the housing.

Preferably, each of the execution units includes an insertion post, a stop plate, and a free arm that are connected in sequence. The planetary gear is sleeved on the insertion post. The free arm is penetrated in the support. The stop plate movably abuts against the support.

Preferably, the execution unit further includes a stop post. A stop slot is disposed on the planetary gear. The stop post is disposed between the insertion post and the stop plate. The stop slot is adapted to the stop post.

Preferably, each of the free arms is provided with at least one torsional position.

Preferably, an alignment notch is disposed on each of the stop slots at a same position.

An alignment protrusion is disposed on each of the stop posts. Set positions and set orientations of the alignment protrusions on the stop unit are the same. The alignment protrusion is detachably inserted in the alignment notch.

Preferably, several alignment marks are disposed on the sun gear in a peripheral direction. Each of the alignment marks is distributed at an equal distance. Each of the alignment marks is in a one-to-one correspondence with each of the alignment protrusions.

Preferably, the support includes a base and an upper cover. An installation hole and several through holes are disposed on the base. A connecting hole and several avoidance holes are disposed on the upper cover.

The base is connected to the upper cover. An accommodation interval is disposed between the base and the upper cover. Both the sun gear and each of the planetary gears are located in the accommodation interval. The sun gear is disposed in the installation hole. Each of the free arms is disposed in a one-to-one correspondence with each of the through holes. Each of the insertion posts is disposed in a one-to-one correspondence with each of the avoidance holes. At least a part of the sun gear is exposed in the connecting hole for connection with the gear transmission component.

Preferably, the gear transmission component includes a torque gear. A torque transmission post is disposed on the torque gear. The torque gear is driven and connected to the motor.

A central post is disposed on the sun gear, and a torque slot is disposed at an end of the central post.

The central post is penetrated in the connecting hole. The torque transmission post is detachably inserted in the torque slot. When the torque gear is driven by the motor to rotate, the torque transmission post drives the central post to rotate, so that the sun gear rotates.

Preferably, the multi-stage synchronous driving mechanism further includes an installation rack, and the motor is disposed on the installation rack.

The gear transmission component further includes a worm and a plurality of transmission gears. Each of the transmission gears is rotatably disposed on the installation rack, respectively. The motor drive is driven and connected to the worm. Each of the transmission gears is engaged in sequence. One of the transmission gears is engaged with the worm.

When the installation rack is assembled in aligned and assembled with the support, the installation rack drives another of the transmission gears to be engaged with the torque gear.

A second aspect of the present disclosure provides an electric toy. The electric toy includes the multi-stage synchronous driving mechanism according to any one of the technical solutions. The electric toy further includes several light emitting parts. Each of the light emitting parts is located in the housing and correspondingly disposed in the support. The present disclosure has the following beneficial effects.

The present disclosure relates to a multi-stage synchronous driving mechanism and an electric toy. The electric toy includes a multi-stage synchronous driving mechanism. In terms of the multi-stage synchronous driving mechanism, on one hand, by means of engagement between a sun gear and a planetary gear, all execution units are ensured to rotate synchronously based on a preset proportion, thereby greatly improving consistency and accuracy of motion among execution units.

Further, torque of a motor can be transferred to the sun gear by using the gear transmission component, and a single sun gear can drive a plurality of planetary gears to rotate at the same time, so that the plurality of execution units rotate relative to a support without using a plurality of transmission structures or a plurality of transmission shafts. In this way, the present disclosure may have excellent structural flexibility and lower manufacturing costs.

BRIEF DESCRIPTION OF THE DRAWINGS

The above and other features, advantages and aspects of various embodiments of the present application will become more apparent by referring to the following detailed description in combination with the attached figures, where in exemplary embodiments of the present disclosure, same reference numerals typically represent a same component.

DETAILED DESCRIPTION OF THE EMBODIMENTS

Embodiments of the present disclosure are described with reference to attached figures in more detail. Although the embodiments of the present disclosure are shown in the attached figures, it should be understood that the present disclosure may be implemented in various forms and should not be limited by the embodiments set forth herein. On the contrary, the embodiments are provided to enable a more thorough understanding of the present disclosure and completely convey the scope of the present disclosure to a person skilled in the art.

It should be understood that the terms "first", "second" and the like employed in the present disclosure describe various information, but such information should not be limited to these terms. These items are only used to distinguish the same type of information from each other. For example, "first" information could be known as "second" information, and similarly, "second" formation could also be known as "first" information, without departing from the scope of the present disclosure. Therefore, a feature limited by "first" or "second" may explicitly or implicitly include one or more features. In the description of the present disclosure, the meaning of "a plurality of" means two or more unless expressly specifically defined otherwise.

In the description of the present disclosure, it needs to be illustrated that the indicative direction or position relations of the terms such as "length", "width", "upper", "lower", "front", "rear", "left", "right", "vertical", "horizontal", "top", "bottom", "inside" and "outside" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure.

Terms "install" "link", "connect", "fix", etc. should be understood in a broad sense unless otherwise definitely stipulated or limited. For example, a connection may be a fixed connection, a detachable connection, or an integrated connection; may be a mechanical connection or an electrical connection; and may be a direct connection, an indirect connection through an intermediate medium, or a connection inside two elements or interaction between two elements. A person of ordinary skill in the art can understand specific meanings of these terms in the present disclosure based on specific situations.

Figure 1:
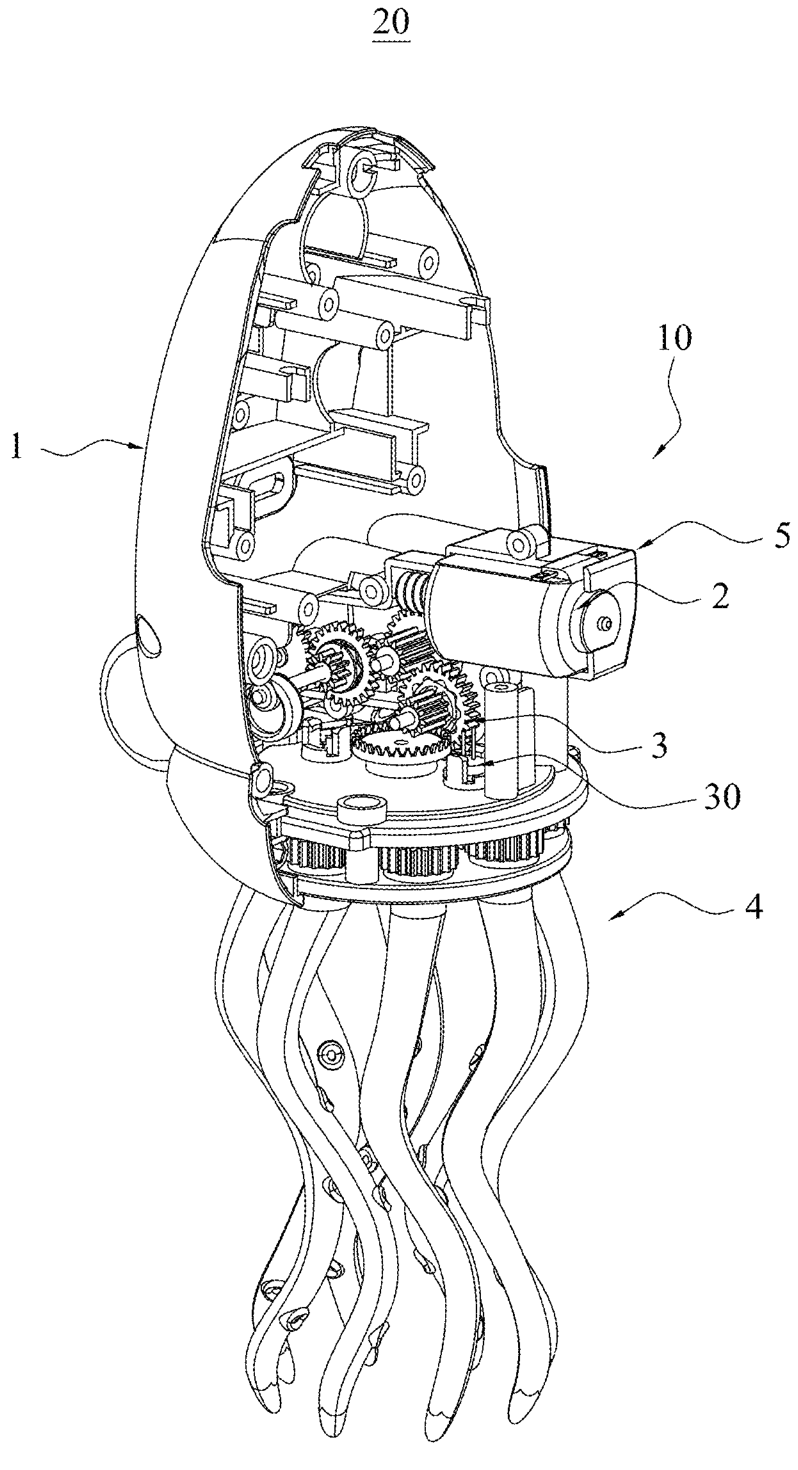
FIG. 1 is a schematic structural diagram of an electric toy in some embodiments of the present disclosure.
Figure 2:
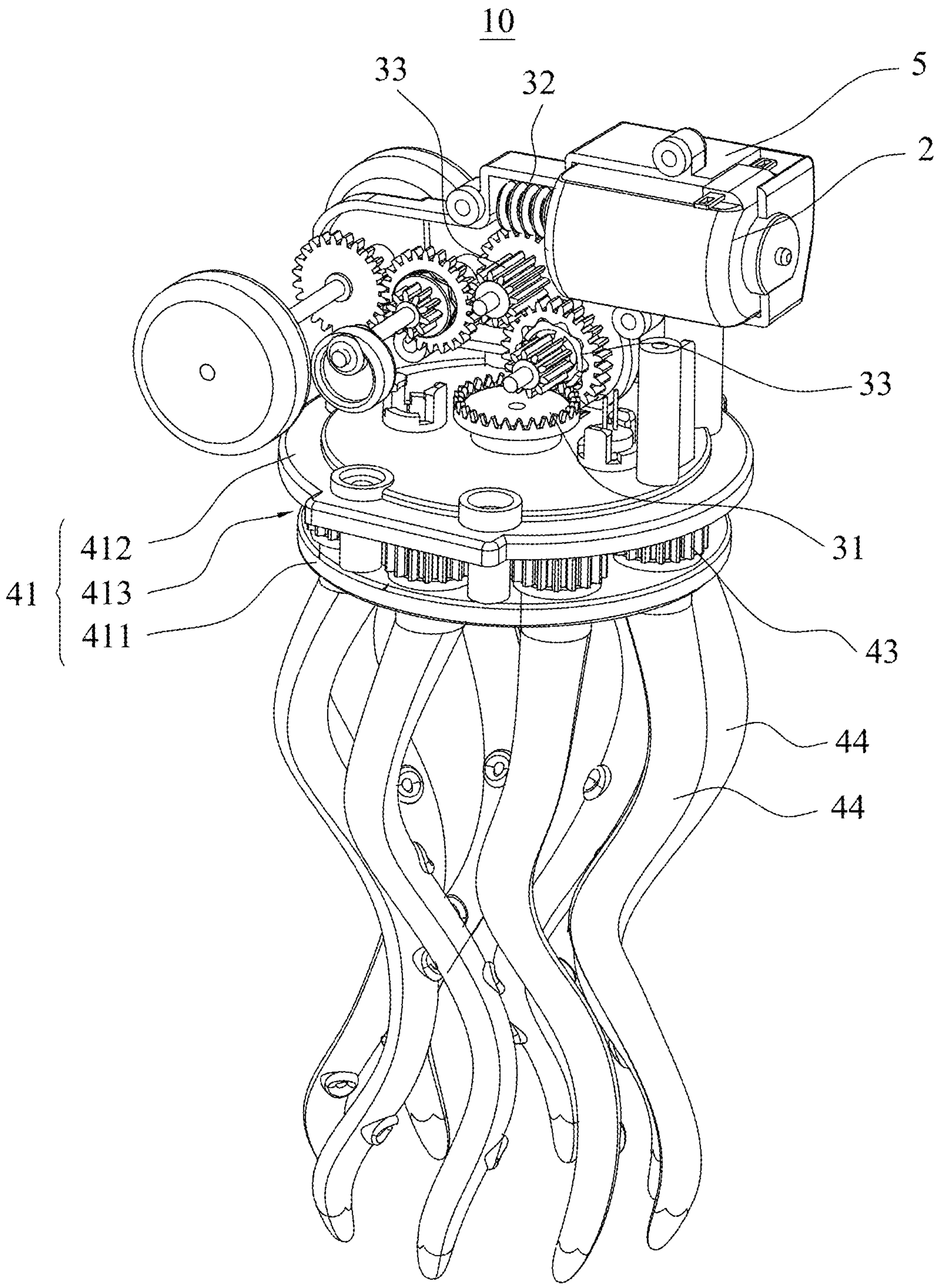
FIG. 2 is a schematic structural diagram of a multi-stage synchronous driving mechanism in some embodiments of the present disclosure.

FIG. 1 and FIG. 2 show a multi-stage synchronous driving mechanism 10 in some embodiments of the present disclosure. The multi-stage synchronous driving mechanism 10 can be applied to various toys in the prior art, and shapes, specifications, or uses of the toys are not limited.

As shown in FIG. 1, the multi-stage synchronous driving mechanism 10 includes a housing 1, a motor 2, a gear transmission component 3, and a multi-stage execution component 4. The motor 2, the gear transmission component 3, and the multi-stage execution component 4 are disposed on the housing 1, respectively.

It may be understood that the housing 1 is configured to provide space required for installation of remaining components and parts and an installation position, and further plays a protective role. The motor 2 is configured to output torque when being powered on. The gear transmission component 3 is configured to further transfer the torque output by the motor 2 to the multi-stage execution component 4. The multi-stage execution component 4 can move on the housing 1 after receiving the torque.

As shown in FIG. 1 to FIG. 5, the motor 2 is disposed on the housing 1, and the gear transmission component 3 is driven and connected to the motor 2. The multi-stage execution component 4 includes a support 41, a sun gear 42, a plurality of planetary gears 43, and a plurality of execution units 44. The support 41 is disposed on the housing 1. The sun gear 42 and each of the planetary gears 43 are rotatably disposed on the support 41, respectively. Each of the execution units 44 is connected to each of the planetary gears 43 in a one-to-one correspondence. The sun gear 42 is driven and connected to the gear transmission component 3. Each of the planetary gears 43 is engaged with the sun gear 42, respectively.

The motor 2 drives the sun gear 42 to rotate by using the gear transmission component 3, so that the sun gear 42 drives each of the planet gears 43 to rotate, thereby driving each of the execution units 44 to rotate relative to the housing 1.

It may be understood that the gear transmission component 3 may be configured to transfer output torque of the motor 2 to the sun gear 42 by means of engagement of a series of gears. The support 41 provides installation and support for the sun gear 42 and the planetary gear 43 to ensure that the sun gear 42 and the planetary gear 43 can rotate smoothly. The support 41 is fastened to the housing 1 to maintain stability of the entire multi-stage execution component.

The sun gear 42 receives the torque from the gear transmission component 3 and distributes power to each planetary gear 43. The planetary gear 43 is driven by the sun gear 42, and the planetary gear 43 rotates around an axis of the planetary gear 43. Rotation of all the planetary gears 43 is synchronized, so that the execution units 44 move synchronously. An appearance of the execution unit 44 may be flexibly set. However, mutual interference in a position of each execution unit 44 during rotation should be avoided.

Specifically, an appearance of the execution unit 44 and an installation angle may be adjusted to avoid position interference during rotation.

It should be noted that, after the motor 2 is powered on, the motor 2 outputs specific torque, and transfers the torque to the sun gear 42 by using the gear transmission component 3. The sun gear 42 starts to rotate after being subjected to a driving force. Because the planetary gear 43 keeps in engagement with the sun gear 42 and the planetary gear 43 is installed on the support 41, each planetary gear 43 rotates around own axis along with rotation of the sun gear 42. Rotation of each planetary gear 43 may drive the execution unit 44 connected to the planetary gear 43 to rotate relative to the housing 1.

Figure 3:
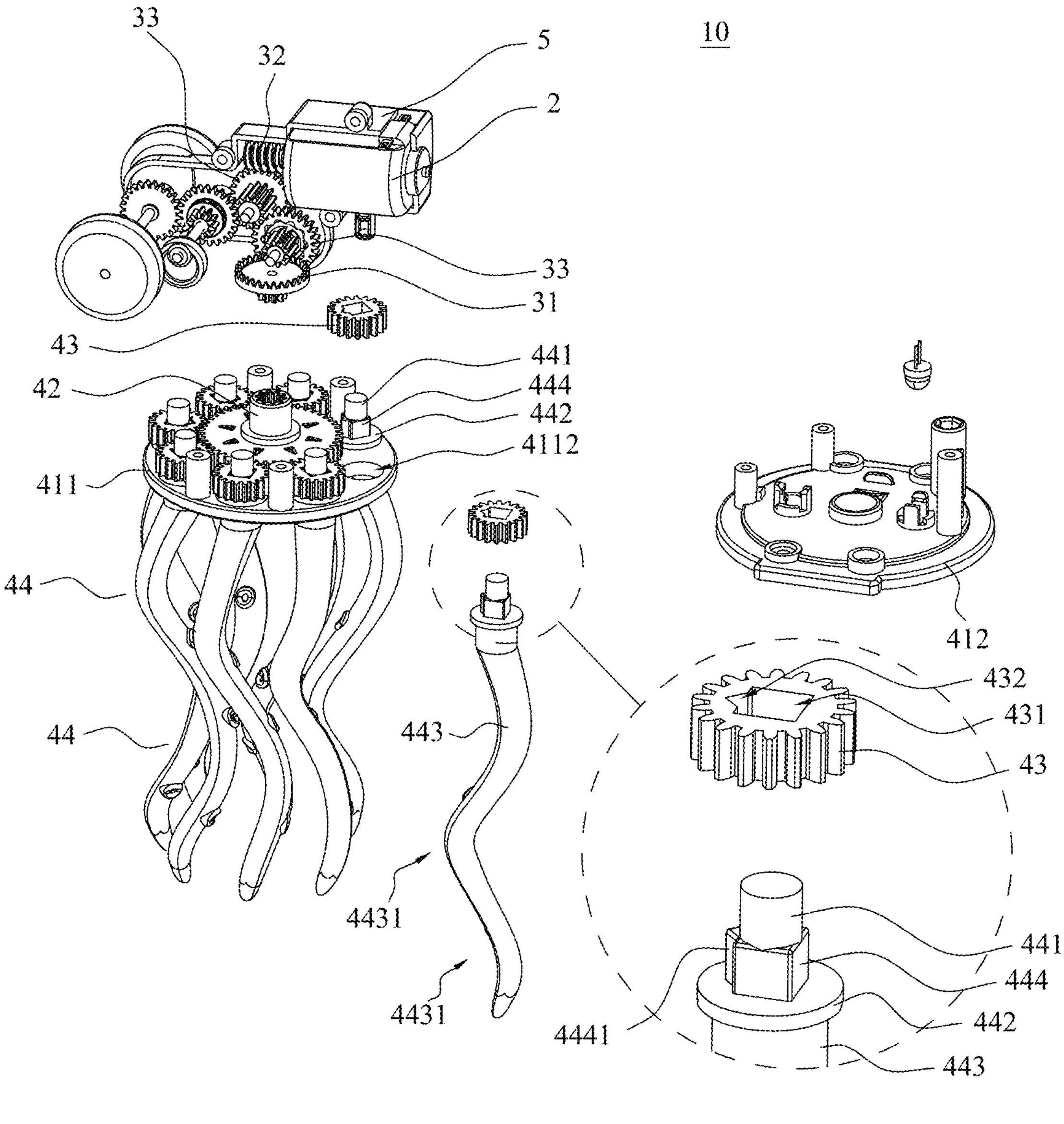
FIG. 3 is an explosive view of a multi-stage synchronous driving mechanism shown in FIG. 2.
Figure 4:
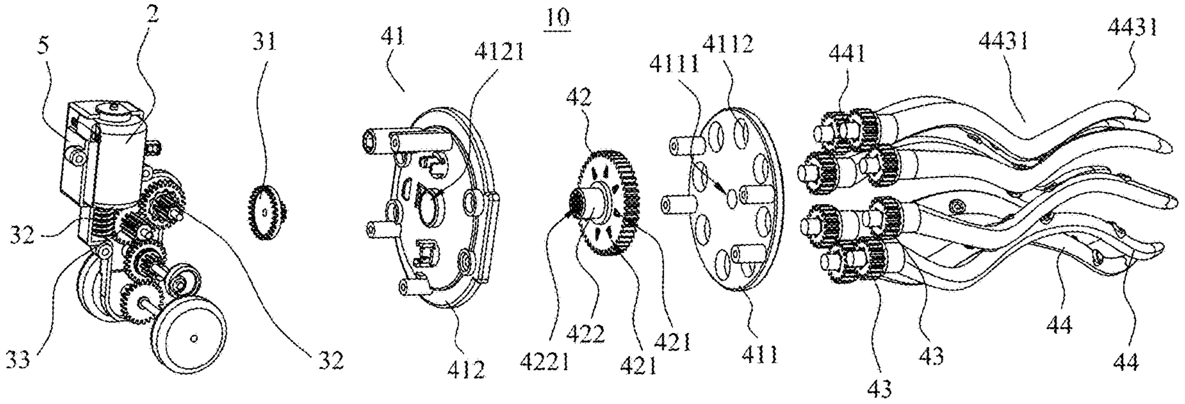
FIG. 4 is another exploded view of a multi-stage synchronous driving mechanism shown in FIG. 2.
Figure 5:
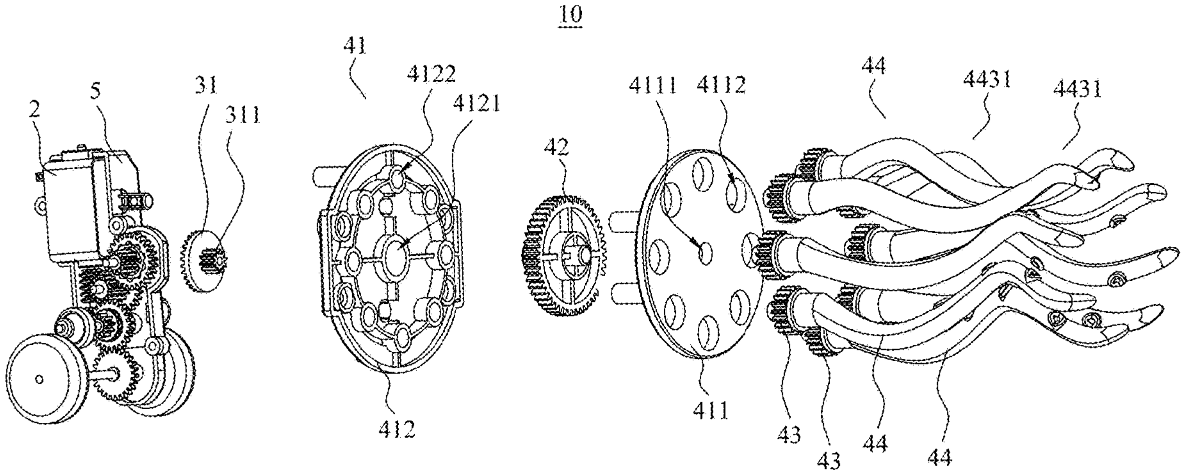
FIG. 5 is an explosive view of a multi-stage synchronous driving mechanism shown in FIG. 4 from another perspective.

As shown in FIG. 3 to FIG. 5, in some embodiments of the multi-stage synchronous driving mechanism 10, each of the execution units 44 includes an insertion post 441, a stop plate 442, and a free arm 443 that are connected in sequence. The planetary gear 43 is sleeved on the insertion post 441. The free arm 443 is penetrated in the support. The stop plate 442 movably abuts against the support 41.

It may be understood that the insertion post 441 is configured to connect the planetary gear 43 and the stop plate 442. One end of the insertion post 441 is fixed on the planetary gear 43, and the other end of the insertion post 441 is disposed on the stop plate 442, thereby ensuring that rotation of the planetary gear 43 can be transferred to the stop plate 442 and the free arm 443. The stop plate 442 plays a role in preventing the execution unit 44 from releasing the support 41. The free arm 443 is a tail end part of the execution unit 44, and is configured to implement a specific motion function.

As shown in FIG. 3, in some embodiments of the multi-stage synchronous driving mechanism 10, the execution unit 44 further includes a stop post 444. A stop slot 431 is disposed on the planetary gear 43. The stop post 444 is disposed between the insertion post 441 and the stop plate 442. The stop slot 431 is adapted to the stop post 444.

It may be understood that, after the stop post 444 is inserted into the stop slot 431, positions of the planetary gear 43 and the execution unit 44 can be fixed. When the planetary gear rotates, the execution unit is smoothly driven to rotate by cooperating with the stop post 444 and the stop slot 431.

As shown in FIG. 3 to FIG. 5, in some embodiments of the multi-stage synchronous driving mechanism 10, each free arm 443 is provided with at least one torsional position 4431.

It may be understood that the torsional position 4431 is a specific structure on the free arm 443 (which may be specifically configured to be formed by twisting a part of the free arm 443) and is configured to form a twisting visual effect during rotation of the free arm 443, thereby increasing diversity and complexity of motion.

As shown in FIG. 3, in some embodiments of the multi-stage synchronous driving mechanism 10, an alignment notch 432 is disposed on each of the stop slots 431 at a same position. An alignment protrusion 4441 is disposed on each of the stop posts 444. Set positions and set orientations of the alignment protrusions 4441 on the stop unit are the same. The alignment protrusion 4441 is detachably inserted in the alignment notch 432.

It may be understood that the alignment notch 432 is configured to cooperate with the alignment protrusion 4441 on the stop post 444 to ensure a correct position of the stop post 444 in the stop slot 431. The set positions and the set orientations of the alignment protrusions 4441 on the stop post 444 are the same, so that the alignment effect of all the stop posts 444 is the same, which may guide correct alignment installation during assembly.

Specifically, an installation direction of each execution unit may be directly determined by an orientation of each alignment protrusion 4441, so as to avoid an error in an assembly angle as far as possible.

As shown in FIG. 3 and FIG. 4, in some embodiments of the multi-stage synchronous driving mechanism 10, several alignment marks 421 are disposed on the sun gear 42 in a peripheral direction. The alignment marks 421 are distributed at an equal distance. Each of the alignment marks 421 is in a one-to-one correspondence with each of the alignment protrusions 4441.

It may be understood that the alignment mark 421 is a specific structure in a peripheral direction of the sun gear 42, and is configured to cooperate with the alignment protrusion 4441 on the stop post 444, so as to ensure accurate alignment of an initial position and a rotation angle of the planetary gear 43 and the execution unit 44, thereby effectively preventing mutual interference between the execution units 44 in a rotation process.

As shown in FIG. 2 to FIG. 5, in some embodiments of the multi-stage synchronous driving mechanism 10, the support 41 includes a base 411 and an upper cover 412. An installation hole 4111 and several through holes 4112 are disposed on the base 411. A connecting hole 4121 and several avoidance holes 4122 are disposed on the upper cover 412.

The base 411 is connected to the upper cover 412. An accommodation interval 413 is disposed between the base 411 and the upper cover 412. Both the sun gear 42 and each of the planetary gears 43 are located in the accommodation interval 413. The sun gear 42 is disposed in the installation hole 4111. Each of the free arms 443 is disposed in a one-to-one correspondence with each of the through holes 4112. Each of the insertion posts 441 is disposed in a one-to-one correspondence with each of the avoidance holes 4122. At least a part of the sun gear 42 is exposed in the connecting hole 4121 for connection with the gear transmission component 3.

It may be understood that the base 411 is configured to fix and support the sun gear 42 and the planetary gear 43. The installation hole 4111 is configured to install the sun gear 42 to ensure that the sun gear 42 is fixed and positioned on the base 411. The through hole 4112 is configured to penetrate through the free arm 443 to ensure that the free arm 443 can stretch out from the base 411 for predetermined motion.

The upper cover 412 cooperates with the base 411 to form an accommodation interval 413 for protecting internal components. The connecting hole 4121 is configured to connect the gear transmission component 3 to ensure that the gear transmission component 3 can transfer power to the sun gear 42. The avoidance hole 4122 is configured to insert the insertion post 441, so as to perform position limitation on the insertion post 441 by using a hole wall of the avoidance hole 4122, thereby ensuring smooth rotation of the insertion post 441.

As shown in FIG. 3 to FIG. 5, in some embodiments of the multi-stage synchronous driving mechanism 10, the gear transmission component 3 includes a torque gear 31. A torque transmission post 311 is disposed on the torque gear 31. The torque gear 31 is driven and connected to the motor 2.

A central post 422 is disposed on the sun gear, and a torque slot 4221 is disposed at an end 422 of the central post 422.

The central post 422 is penetrated in the connecting hole 4121. The torque transmission post 311 is detachably inserted in the torque slot 4221. When the torque gear 31 is driven by the motor 2 to rotate, the torque transmission post 311 drives the central post 422 to rotate, so that the sun gear 42 rotates.

It may be understood that the torque gear 31 is configured to transfer torque by the motor 2 to the sun gear 42. Specifically, the torque gear 31 transfers rotary power of the motor 2 to the sun gear 42 by using driving connection with the motor 2.

The torque transmission post 311 is configured to cooperate with the central post 422 of the sun gear 42, so as to realize transfer of the torque. When the torque gear 31 is driven by the motor 2 to rotate, the torque transmission post 311 may drive the central post 422 to rotate, so that the sun gear 42 is driven to rotate.

The torque transmission post 311 is detachably inserted into the torque slot 4221 for ease of installation and maintenance, and also allows adjustment or replacement of components when required.

The torque slot 4221 is configured to cooperate with the torque transmission post 311, so as to realize transfer of the torque.

As shown in FIG. 1 to FIG. 5, in some embodiments of the multi-stage synchronous driving mechanism 10, the multi-stage synchronous driving mechanism 10 further includes an installation rack 5, and the motor 2 is disposed on the installation rack 5.

The gear transmission component 3 further includes a worm 32 and a plurality of transmission gears 33. Each of the transmission gears 33 is rotatably disposed on the installation rack 5, respectively. The motor 2 is driven and connected to the worm 32. Each of the transmission gears 33 is engaged in sequence, and one of the transmission gears 33 is engaged with the worm 32.

when the installation rack 5 is assembled in aligned and assembled with the support 41, the installation rack 5 drives another of the transmission gears 33 to be engaged with the torque gear 31.

It may be understood that the installation rack 5 is configured to fix some parts of the motor 2 and the gear transmission components 3. The installation rack 5 provides installation and fixing positions for the motor 2 and the worm 32 to ensure stability and reliability in operation. The worm 32 is configured to transfer the torque of the motor 2 to the transmission gear 33. The transmission gears 33 are engaged in sequence, so that power can be transferred to the torque gear 31 from the worm 32.

As shown in FIG. 1, the electric toy 20 includes the multi-stage synchronous driving mechanism 10 and several light emitting parts 30. Each of the light emitting parts 30 is located in the housing 1 and correspondingly disposed in the support 41.

It may be understood that the light emitting part 30 is configured to provide a visual effect, and enhance interaction and interest of the toy. The light emitting part 30 may emit light of different colors and brightness, and increases visual attraction of the toy, so that the toy can attract attention of users in a dark environment.

The light emitting part 30 may be synchronized with motion of the multi-stage synchronous driving mechanism 10, for example, is lit or twinkled during specific motion, thereby increasing interactivity and interest of the toy. The light emitting part 30 may be installed at different parts of the toy, and a unique visual effect is created by different arrangements and combinations, thereby improving beauty of the toy.

The present disclosure has the following beneficial effects.

The present disclosure relates to a multi-stage synchronous driving mechanism and an electric toy. The electric toy includes a multi-stage synchronous driving mechanism. In terms of the multi-stage synchronous driving mechanism, on one hand, by means of engagement between a sun gear and a planetary gear, all execution units are ensured to rotate synchronously based on a preset proportion, thereby greatly improving consistency and accuracy of motion among execution units.

Further, torque of a motor can be transferred to the sun gear by using the gear transmission component, and a single sun gear can drive a plurality of planetary gears to rotate at the same time, so that the plurality of execution units rotate relative to a support without using a plurality of transmission structures or a plurality of transmission shafts. In this way, the present disclosure may have excellent structural flexibility and lower manufacturing costs.

Solutions of the present disclosure are described with reference to attached figures in more detail. In the foregoing embodiments, the description of each embodiment has respective focuses. For a part that is not described in detail in an embodiment, reference may be made to related descriptions in other embodiments. In addition, a person skilled in the art should also appreciate that the related actions and modules in the specification are not necessarily mandatory to the present disclosure. In addition, it may be understood that steps in the method according to the embodiments of the present disclosure may be sequentially adjusted, combined, and deleted according to actual requirements. A module in the device in the embodiments of the present disclosure may be combined, divided, and deleted according to actual requirements.

The embodiments of the present disclosure have been described above. The foregoing description is exemplary, not exhaustive, and is not limited to the disclosed embodiments. Many modifications and changes are apparent to a person of ordinary skill in the art without departing from the scope and spirit of the described embodiments. The terminology used herein is intended to best explain the principles, practical applications, or improvements to the technologies in the market of the embodiments, or to enable other embodiments disclosed herein to be understood by those of ordinary skill in the art.

What is claimed is:

1. A multi-stage synchronous driving mechanism, comprising:

a housing;

a motor, disposed on the housing;

a gear transmission component, driven and connected to the motor; and a multi-stage execution component, comprising a support, a sun gear, a plurality of planetary gears, and a plurality of execution units, wherein the support is disposed on the housing, the sun gear and each of the planetary gears are rotatably disposed on the support, respectively, each of the execution units is connected to each of the planetary gears in a one-to-one correspondence, the sun gear is driven and connected to the gear transmission component, and each of the planetary gears is engaged with the sun gear, respectively; wherein the motor drives the sun gear to rotate by using the gear transmission component, so that the sun gear drives each of the planet gears to rotate, thereby driving each of the execution units to rotate relative to the housing;

wherein each of the execution units comprises an insertion post, a stop plate, and a free arm that are connected in sequence, the planetary gear is sleeved on the insertion post, the free arm is penetrated in the support, and the stop plate movably abuts against the support;

wherein the execution unit further comprises a stop post, a stop slot is disposed on the planetary gear, the stop post is disposed between the insertion post and the stop plate, and the stop slot is adapted to the stop post.

2. The multi-stage synchronous driving mechanism according to claim 1, wherein each of the free arms is provided with at least one torsional position.

3. An electric toy, wherein the electric toy comprises the multi-stage synchronous driving mechanism according to claim 2, and the electric toy further comprises several light emitting parts, wherein each of the light emitting parts is located in the housing and correspondingly disposed in the support.

4. The multi-stage synchronous driving mechanism according to claim 1, wherein an alignment notch is disposed on each of the stop slots at a same position;

an alignment protrusion is disposed on each of the stop posts, set positions and set orientations of the alignment protrusions on the stop unit are the same, and the alignment protrusion is detachably inserted in the alignment notch.

5. The multi-stage synchronous driving mechanism according to claim 4, wherein several alignment marks are disposed on the sun gear in a peripheral direction, the alignment marks are distributed at an equal distance, and each of the alignment marks is in a one-to-one correspondence with each of the alignment protrusions.

6. An electric toy, wherein the electric toy comprises the multi-stage synchronous driving mechanism according to claim 5, and the electric toy further comprises several light emitting parts, wherein each of the light emitting parts is located in the housing and correspondingly disposed in the support.

7. An electric toy, wherein the electric toy comprises the multi-stage synchronous driving mechanism according to claim 4, and the electric toy further comprises several light emitting parts, wherein each of the light emitting parts is located in the housing and correspondingly disposed in the support.

8. The multi-stage synchronous driving mechanism according to claim 1, wherein the support comprises a base and an upper cover, an installation hole and several through holes are disposed on the base, and a connecting hole and several avoidance holes are disposed on the upper cover; and the base is connected to the upper cover, an accommodation interval is disposed between the base and the upper cover, both the sun gear and each of the planetary gears are located in the accommodation interval, the sun gear is disposed in the installation hole, each of the free arms is disposed in a one-to-one correspondence with each of the through holes, each of the insertion posts is disposed in a one-to-one correspondence with each of the avoidance holes, and at least a part of the sun gear is exposed in the connecting hole for connection with the gear transmission component.

9. The multi-stage synchronous driving mechanism according to claim 8, wherein the gear transmission component comprises a torque gear, a torque transmission post is disposed on the torque gear, and the torque gear is driven and connected to the motor; and a central post is disposed on the sun gear, and a torque slot is disposed at an end of the central post;

the central post is penetrated in the connecting hole, the torque transmission post is detachably inserted in the torque slot, and when the torque gear is driven by the motor to rotate, the torque transmission post drives the central post to rotate, so that the sun gear rotates.

10. The multi-stage synchronous driving mechanism according to claim 9, wherein the multi-stage synchronous driving mechanism further comprises an installation rack, and the motor is disposed on the installation rack; and the gear transmission component further comprises a worm and a plurality of transmission gears, each of the transmission gears is rotatably disposed on the installation rack, respectively, the motor is driven and connected to the worm, each of the transmission gears is engaged in sequence, and one of the transmission gears is engaged with the worm; wherein when the installation rack is assembled in aligned and assembled with the support, the installation rack drives another of the transmission gears to be engaged with the torque gear.

11. An electric toy, wherein the electric toy comprises the multi-stage synchronous driving mechanism according to claim 10, and the electric toy further comprises several light emitting parts, wherein each of the light emitting parts is located in the housing and correspondingly disposed in the support.

12. An electric toy, wherein the electric toy comprises the multi-stage synchronous driving mechanism according to claim 9, and the electric toy further comprises several light emitting parts, wherein each of the light emitting parts is located in the housing and correspondingly disposed in the support.

13. An electric toy, wherein the electric toy comprises the multi-stage synchronous driving mechanism according to claim 8, and the electric toy further comprises several light emitting parts, wherein each of the light emitting parts is located in the housing and correspondingly disposed in the support.

14. An electric toy, wherein the electric toy comprises the multi-stage synchronous driving mechanism according to claim 1, and the electric toy further comprises several light emitting parts, wherein each of the light emitting parts is located in the housing and correspondingly disposed in the support.

* * * * *